INVENTOR.
Francis E. Ryder
BY Barry L. Clark
Robert W. Beart
His Att'ys

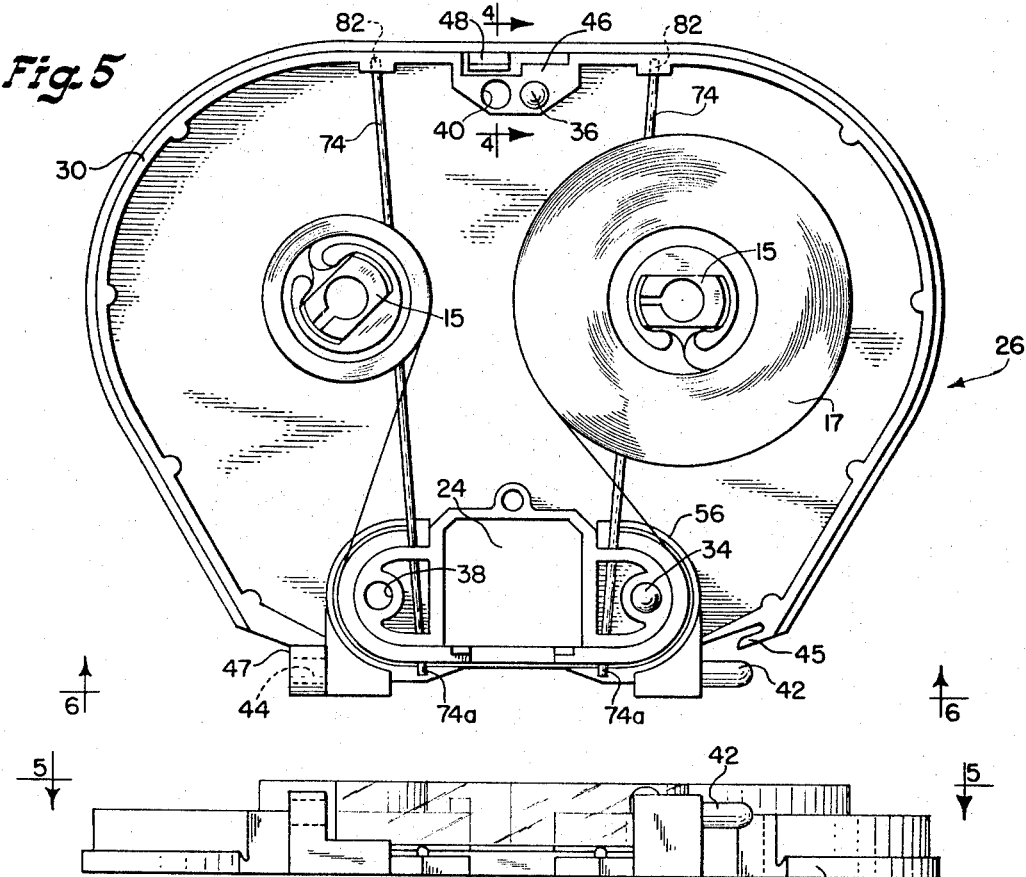

United States Patent Office 3,432,111
Patented Mar. 11, 1969

3,432,111
WEB TRANSPORTING CARTRIDGE FORMED OF A PAIR OF IDENTICAL HOUSING MEMBERS
Francis E. Ryder, Des Plaines, Ill., assignor to Illinois Tool Works Inc., Chicago, Ill., a corporation of Delaware
Filed Oct. 24, 1966, Ser. No. 588,908
U.S. Cl. 242—55.13
Int. Cl. G11b *15/32;* B65h *55/00, 75/02*
9 Claims

ABSTRACT OF THE DISCLOSURE

Molded cartridge for transporting web material such as film from one interior portion of the cartridge to another while permitting information on the web to be sensed is formed of a pair of identical members which have cooperating aligning, hinging and latching means.

---

This invention relates to a cartridge for transporting web material from a supply in one interior portion of the cartridge to a take-up in another portion while permitting information contained on the web to be sensed.

Although the invention would have broad utility with many types of webs to be fed past a sensing station such as magnetic tape, motion picture film, and webs or films in which an image is physically impressed in the web, it has particular utility in connection with a microfilm image retrieval ssytem. In such systems, it is possible to store a large volume of information in a very small amount of space while retaining an ability to retrieve the information very quickly. The speed with which an image can be retrieved is increased tremendously when the roll of microfilm is contained in a cartridge as compared to being stored on a spool where the film must be threaded and rewound after each use. The cartridge which forms the preferred embodiment of the present invention is adapted to be used in a microfilm reading device where the film is never touched by hand after it is loaded into the cartridge. The film is driven by the reader which includes a pair of drive spindles on a cartridge support plate. The spindles are engageable with a pair of film supply and take-up cores in the cartridge. A prism in the reader is positioned so that when an opening in the cartridge is placed over it, light from a source positioned underneath the cartridge support plate may be projected through an image of the film which is in an aperture in the cartridge.

If a user desires to benefit from the advantages of a cartridge storage system to protect his films at all times and render the images thereon quickly retrievable without the necessity of rewinding following viewing, a film cartridge must be provided for each roll of film. Since much microfilmed material is only rarely referred to, it is important that the cost of the cartridge be kept low enough so that over a period of use the savings in time and protection against film damage provided by the cartridge will exceed the cost of the cartridge. A cartridge which is presently being used for the storage and presentation of microfilm in a retrieval system such as is described above, has been found to be somewhat complicated and expensive to manufacture in that the cartridge includes separate molded body and cover members which must be held together by screws. Additionally, the cartridge requires many other parts to be assembled to it including film guiding rollers, an aperture plate and a wear plate. These parts must all be attached in separate operations such as cementing or the insertion of fasteners. In addition, the moldings require certain machining operations to insure that the cartridge and the parts attached thereto are aligned relative to the reader apparatus and each other. Since the cartridge which is presently being used is held together by screw type fasteners, the operation of loading a cartridge with a roll of film consumes an inordinate amount of time and requires the use of a screw driver. Accordingly, it is an object of this invention to provide a cartridge which can be loaded simply and easily and without the use of tools.

Another object of my invention is to provide a web-transporting cartridge wherein the top and bottom of the cartridge comprise identical molded parts.

A further object of my invention is to provide a web-transporting cartridge which is reliable and economical and requires only a very few number of parts and assembly operations.

An additional object of my invention is to provide a web-transporting cartridge wherein a guide member which holds the film out of frictional engagement with the cartridge also serves to hold other parts of the cartridge together.

Still another object of my invention is to provide a web-transporting cartridge having integral hinge and locking portions which hold the sides of the cartridge firmly together and prevent the separation thereof even though the cartridge may be dropped.

The above objects are accomplished by the present invention wherein a web-transporting cartridge is formed by molding a pair of identical plastic housing members which include integral hinge, alignment, and locking portions for holding the pair of housings together. In order to assure an economical cartridge having a very low friction drag effect, or wear, on a web such as microfilm being transported through the cartridge, the invention contemplates the insertion of a guiding member in each half of the cartridge which is made of a material, such as that which is known as Delrin (trademark) AF, having a very low coefficient of friction. The guiding members are also identical to each other and interlock to form a web channel and aperture when the housing members are locked together. The guiding members are held, simply but firmly, by thin wire members which snap into place in the cartridge. Aside from holding the inserted guiding members in place, the wires also serve as minimal friction edge guides for the web while it is coiled in spool form inside the cartridge to keep the web from contacting the housing. Portions of the wire extending across the guiding member web channel also function as edge guides to firmly vertically position the web in the aperture. Although the invention contemplates the use of inserted guide members, the main purpose of these members is to reduce the cost of the cartridge and permit materials of lower cost and higher coefficients of friction to be used for the non-film guiding parts of the cartridge. If a clear material is used for the cartridge body, indicia can be molded in the housing to permit a user to index the film to a desired position.

The present invention has many advantages, a main one of which is the provision of a cartridge which protects film or other material against dust in storage and against damage due to wear or stresses when film is being transported therethrough at high speeds. Furthermore, the film is rigidly maintained in a predetermined position relative to image sensing structure such as an optical system with which the cartridge is associated. An additional important advantage of the invention lies in its simple construction which makes it economical to produce, assemble, and use. The cartridge is economical to produce since it requires only two different molded plastic parts and two straight lengths of wire per half. By having such a few number of parts, the cost of tooling and inventory can be kept quite low. The assembly of the cartridge requires only that one molded plastic part be placed inside another and the wires inserted through the holes in the two and snapped into place. The cartridge is economical to the user in that it may be loaded, and unloaded if desired, extremely quickly and simply merely by releasing an integral lock member formed on the cartridge, inserting a pair of film cores therein to which the film is attached, and laying th e film in a guide path.

The foregoing and other objects, features, and advantages of the invention will be apparent from the following more particular description of a preferred embodiment of the invention, as illustrated in the accompanying drawings in which like reference characters refer to the same parts throughout the different views, and wherein:

FIG. 4 is a sectional view of the cartridge lock members taken on lines 4—4 of FIG. 5 where the cartridge top half has been assembled to the lower half.

FIG. 5 is a top plan view of one of the halves of the cartridge housing taken along line 5—5 of FIG. 6.

FIG. 6 is a front view of the housing taken along line 6—6 of FIG. 5.

FIG. 7 is a top plan view of one of the insert guide members taken on line 7—7 of FIG. 8.

FIG. 8 is a front view of one of the insert guide members taken along line 8—8 of FIG. 7.

Figure 1:
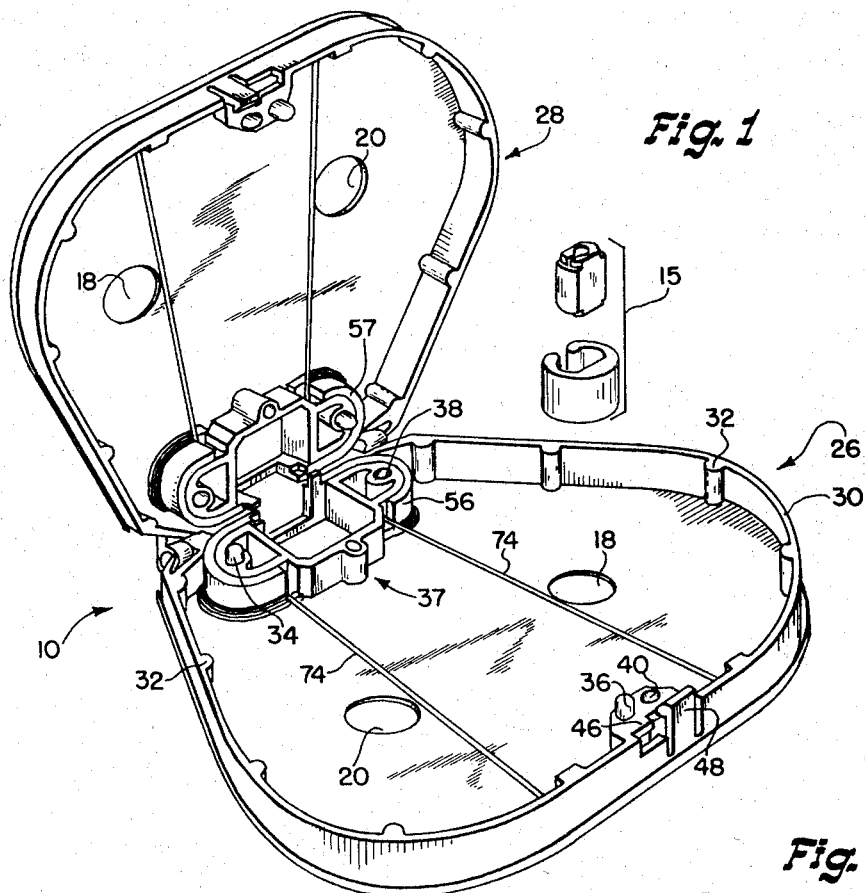
FIG. 1 is a perspective view of the cartridge of the invention with the two identical halves of the housing in a hinged open position.
Figure 2:
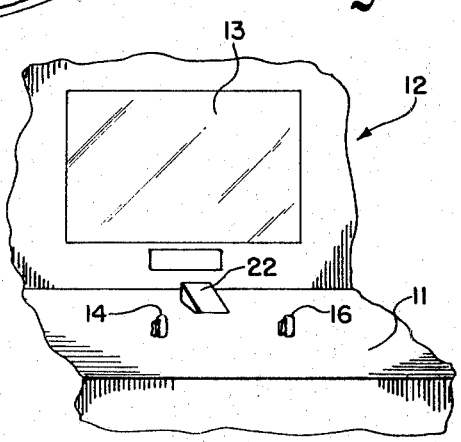
FIG. 2 is a perspective semi-diagrammatic view of a microfilm reader with which the cartridge of the invention is used.
Figure 3:
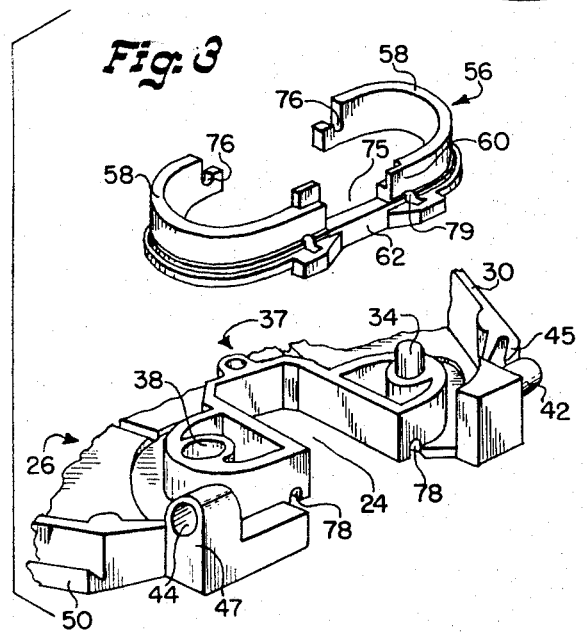
FIG. 3 is a fragmentary exploded perspective view of a portion of one half of the cartridge and the film guiding insert which is assembled therein.

Referring more particularly to the drawings, my invention comprises a cartridge indicated generally at 10 (FIG. 1) which is adapted to be placed on a cartridge support plate 11 (FIG. 2) of a microfilm reader 12. The reader 12 includes a screen 13 on which an image on the microfilm can be viewed, and a pair of spindles 14, 16 which are adapted to engage a pair of film cores 15 having a film 17 anchored thereon. The cores 15 are held in the cartridge by engagement with the walls of spindle apertures 18, 20. A prism 22 in the reader 12 extends upwardly of the cartridge support plate 11 and is adapted to be received within a prism recess 24 in the cartridge. The prism 22 is adapted to receive light from a source under the support plate 11 and project it through a film 17 in the cartridge and into an optical system (not shown) which may include elements for changing the size of the image which appears on screen 13 or rotating it.

The cartridge of the present invention consists of a pair of identical molded plastic lower and upper housing members 26, 28 which include an outer wall portion 30 having ribs 32 for molding purposes as well as for strengthening the wall and preventing the surface of the film from touching the major portions of the wall. The housings 26, 28 each include integral aligning pins 34, 36 located at the front and back of the cartridge respectively. The front aligning pin 34 is formed on one side of a raised film guide support portion 37 which is located at the front of the cartridge and surrounds a prism receiving recess portion 24. The aligning pins 34 and 36 in each of the housings are adapted to be received in complementary shaped holes 38, 40 in the other of the housings when the two housings are brought together in opposing mating relation to form the cartridge. Similarly, the hinge pins 42 formed on each of the housings are adapted to be received by the hinge pin receiving holes 44 in the mating housing. A flexible member 45 located adjacent pin 42 is adapted to be depressed so that it will snap back behind shoulder 47 to make the assembly permanent. While the hinge pins 42 and members 45, 47 lock the front portions of the cartridge housings together, a rigid lock portion 46 and a complementary flexible lock portion 48 formed at the rear of each of the housings cooperate with each other to latch the halves of the cartridge together after the film has been loaded therein.

A rim 50 formed on the periphery of each of the housings forms a channel into which an index strip (not shown) may be inserted to show the contents of the microfilm which is in the cartridge. The channel 50 also serves as a support for the flexible lock portion 48 since the housing has a recess 52 immediately adjacent the flexible lock portion 48 and inwardly of the housing to permit the entry of a die during molding of the housing which forms the overhanging lip 53 of the member 48.

In order to protect and guide a film which is subject to being driven through the cartridge at a high rate of speed, identical insert guiding members 56, 57 are placed in each of the housings 26, 28. The guiding memebrs 56, 57 are preferably made of a low friction plastic material although it would also be possible to merely coat the film contacting surfaces with such material. One material from which the members 56, 57 could be suitably molded in that known as Delrin (trademark) AF. A pair of curved walls 58 and a straight wall 60 in the members 56, 57 guide the film into and out of a film channel 62 where an image on the film may be viewed through a projection aperture whose width is defined by side walls 64 and 66. Curved walls 58 are of a radius greater than that which would be possible by using rollers such as taught by the prior art. Therefore, the area in contact with the film longitudinally is increased, thereby reducing wear and the force necessary to bend the film around a tight radius. When the two halves of the cartridge are assembled together, a projection 64a in each of the guiding members will be received in a recess 66a in the other of the guiding members. This construction serves not only to align the guiding members with each other but also blocks out any light that might otherwise pass between the guiding members at the seam where they are joined together.

In order to prevent the possibility of scratching of the image bearing surface of a film passing around the guiding members 56, 57, the peripheral surface of these members is relieved so that the surface of the film will only be contacted at points outside of the image area. This function is effectively performed by the shoulders 70 which act as rails for the film.

The insert guiding members 56, 57 are held in the housings 26, 28 by means of wires 74. These wires are preferably made of hardened stainless steel since, aside from holding inserts 56 to the housings, they also function as edge guides for the film. They are in engagement with the thin sharp edges of the film, both in the cartridge chamber where it is coiled on the cores 15, and also in the film channel 62. The portions of the wire 74a in the film channel maintain the film vertically aligned as it passes through the projection aperture 75 defined by the aperture walls 64, 66. The wires 74 are assembled to the housings by passing them through rear wire receiving notches 76 in the insert members 56, through the holes 78 in the film guide support portion 37, through a front notch 79 in the guiding member 56 and into front wire receiving recesses 80 in the guiding member which serve as stops for one end of the wires. It will be apparent that the wires are thus anchored to the housing at one end while also anchoring the insert. To engage and anchor the other ends of the wires to the housing the wire is slightly bowed and snapped into rear wire receiving recesses 82 in the wall 30 of the housing.

From the foregoing description, it will be readily apparent that the present invention provides a simple, economical, web-transporting cartridge which tranports film effectively and without damage but with fewer parts and at much lower cost than cartridges previously available. The cartridge is particularly unique in that each of a pair of identical molded plastic housing members which form the exterior of the cartridge have hinge means, aligning means, and locking means integrally formed therewith which coact with complementary shaped means on the other of said pair of housing members when the housing members are mated in opposed relation.

While the invention has been particularly shown and described with reference to a preferred embodiment thereof, it will be understood by those skilled in the art that various changes in form and details may be made without departing from the spirit and scope of the invention.

I claim:

1. A cartridge for holding web-like material to be transported from one interior portion of the cartridge to another while permitting sensing of information contained on the web, comprising:
    a pair of identical molded housing members; and
    at least one integral aligning pin and aligning pin receiving opening formed in each of said housing members;
    at least one integral hinge pin and hinge pin receiving opening formed in each of said housing members;
    a pair of integral latching members formed in each of said housing members, at least one of which is movable relative to the other;
    said housing members being adapted to be locked in mating, opposing relation to each other to form a substantially enclosed chamber when an aligning pin, hinge pin, and latching member in one housing member are engaged with complementary shaped pin receiving openings and a complementary shaped latching member, respectively, in the other housing member.

2. A cartridge according to claim 1, and further including retaining means for preventing said at least one hinge pin from being withdrawn from said at least one hinge pin receiving opening, said retaining means comprising a resilient integral projection on said housing which is adapted to be moved from its normal position as the hinge pin and opening are assembled to each other and to resiliently return toward its normal position when the assembly is complete, whereby to engage a portion of the cartridge material surrounding the opening and prevent it from being withdrawn from the hinge pin.

3. A cartridge according to claim 2, and further including at least one molded, non-rotatable, guiding member in said cartridge adapted to cooperate with a web placed in said cartridge for guiding the web exteriorly of said substantially enclosed chamber and maintaining it in a substantially fixed relationship to a sensing device positioned adjacent thereto.

4. A cartridge in accordance with claim 3 wherein said molded guiding member includes:
    at least one guide rail portion formed thereon, said guide rail portion being positioned so as to extend from the remainder of said guiding member at an edge thereof so that when a photographic film web is transported by the cartridge it will be contacted only by the guide rail portion of the guiding member and in an area of the film which is outside the image area; and
    an aperture defining portion in which an image on the film may be framed when light from a projection device is projected therethrough.

5. A cartridge for transporting a photographic film web according to claim 4 wherein said cartridge includes a pair of identical guiding members, the first of which is mounted relative to one of said housing members and the second of which is mounted on the other housing member and adapted to cooperate with the first guiding member.

6. A cartridge for transporting a photographic film according to claim 4, wherein said cartridge includes:
    a plurality of wires arranged on at least one interior surface of a housing member in a position for supporting the edges of a coil of film out of engagement with said surface;
    said housing member having openings therein adjacent opposite ends of said wires for receiving and retaining said wires;
    said guiding member having openings therein adapted to receive said wires and be anchored thereby to said housing member.

7. A cartridge according to claim 6 wherein said wire extends through at least part of said guiding member and forms an edge guide for film being guided by said guiding member to and from said aperture defining portion.

8. In a cartridge for holding image bearing film to be transported from one interior portion of the cartridge to another interior portion while permitting a portion of the film to pass an external opening in the cartridge where image information contained on the film may be sensed, the improvement comprising:
    a pair of identical molded cover members adapted to be placed in mating engagement with each other to define a web storage chamber;
    at least one elongated hinge pin and at least one complementary shaped hinge pin receiving opening in each of said cover members, said pin and opening on one cover member being slidably receivable relative to the opening and pin respectively on the other cover member to hinge the cover members together and prevent them from being separated from each other when said cartridge is closed;
    a plurality of guide wire members in said cover members;
    a plurality of wire receiving openings in said cover members for holding said wire members in a position whereby they will support the edges of a film stored in said storage chamber and prevent them from contacting the inner surface of the chamber;
    a pair of identical elongated film guiding members insertable in said cartridge;
    a plurality of openings in each of said pair of guiding members for receiving portions of said wires to fixedly mount one of said pair of guiding members to each of said cover members;
    at least one complementary shaped aligning pin and pin receiving opening in each of said film guiding members adapted to be engaged with a corresponding opening and pin, respectively, in the other of said guiding members when said cover members are engaged with each other;
    resilient locking means formed on a portion of each cover member opposite to the portion of the cover member on which the hinge pin and opening are formed;
    said guiding members including a pair of curved side portions and a straight portion adapted to be contacted by the inner edges of a film being guided thereby, the guiding members being relieved to prevent contact with the film at points other than at its edges;
    said guiding members defining an image surrounding aperture and including a pair of film guiding channels for guiding the film to and from said aperture;
    said guide wire members passing across said channels and having one of their ends anchored in a recess in the outer film contacting side of said channel whereby to guide the edges of a film into and out of the aperture;

said cartridge being relieved in an area inwardly of said aperture for permitting an image on a film in said aperture to be sensed by sensing means insertable into said relieved area.

9. A cartridge according to claim 1 and further including at least one guide wire positioned in said cartridge and adapted to engage the edges of a web contained in the cartridge to hold the web edges out of contact with the surfaces of the housing members.

References Cited

UNITED STATES PATENTS

| 3,326,483 | 6/1967 | Ivans | 242—55.13 |
| 2,864,611 | 12/1958 | Gray | 242—55.19 |
| 3,212,125 | 10/1965 | Hussell | 16—171 |

LEONARD D. CHRISTIAN, *Primary Examiner.*

U.S. Cl. X.R.

206—52